US012770294B2

(12) United States Patent
Qi et al.

(10) Patent No.: US 12,770,294 B2
(45) Date of Patent: Oct. 20, 2026

(54) EXPRESSWAY VEHICLE SPEED MEASURING METHOD AND DEVICE BASED ON ROADSIDE MONOCULAR CAMERA CALIBRATION

(71) Applicants: Nanjing University of Science and Technology, Nanjing (CN); Traffic Management Research Institute of the MPS, Wuxi City (CN)

(72) Inventors: Yong Qi, Nanjing (CN); Xiao Jiang, Nanjing (CN)

( * ) Notice: Subject to any disclaimer, the term of this patent is extended or adjusted under 35 U.S.C. 154(b) by 274 days.

(21) Appl. No.: 18/430,523

(22) Filed: Feb. 1, 2024

(65) Prior Publication Data

US 2025/0252599 A1 Aug. 7, 2025

(51) Int. Cl.

| | |
|---|---|
| ***G06T 7/80*** | (2017.01) |
| ***G06T 7/12*** | (2017.01) |
| ***G06T 7/246*** | (2017.01) |
| ***G06T 7/60*** | (2017.01) |
| ***G06V 10/774*** | (2022.01) |
| ***G06V 20/40*** | (2022.01) |
| ***G06V 20/54*** | (2022.01) |

(52) U.S. Cl.

CPC .................. *G06T 7/80* (2017.01); *G06T 7/12* (2017.01); *G06T 7/246* (2017.01); *G06T 7/60* (2013.01); *G06V 10/774* (2022.01); *G06V 20/41* (2022.01); *G06V 20/49* (2022.01); *G06V 20/54* (2022.01); *G06T 2207/10016* (2013.01); *G06T 2207/20081* (2013.01); *G06T 2207/30236* (2013.01); *G06V 2201/08* (2022.01)

(58) Field of Classification Search

CPC .. G06T 7/80; G06T 7/12; G06T 7/246; G06T 7/60; G06T 2207/10016; G06T 2207/20081; G06T 2207/30236; G06V 10/774; G06V 20/41; G06V 20/49; G06V 20/54; G06V 2201/08

USPC .......................................................... 382/107

See application file for complete search history.

(56) References Cited

U.S. PATENT DOCUMENTS

2013/0229517 A1* 9/2013 Kozitsky ................ G08G 1/054 348/148

* cited by examiner

*Primary Examiner* — Stephen P Coleman

(74) *Attorney, Agent, or Firm* — Birchwood IP

(57) ABSTRACT

The present disclosure provides an expressway vehicle speed measuring method and device based on roadside monocular camera calibration. The expressway vehicle speed measuring method based on roadside monocular camera calibration includes: acquiring a traffic monitoring video in a roadside monocular camera; segmenting the traffic monitoring video into a traffic background image set in frames, and transmitting the traffic background image set to a well-trained multi-target detection algorithm to obtain a pixel position of a target vehicle; tracking a target vehicle detection result in each frame through a multi-target tracking algorithm to obtain a movement locus of the target vehicle; and calculating an actual moving distance of the target vehicle according to the movement locus of the target vehicle and a fitted pixel-to-world coordinate conversion curve, thereby calculating a speed of the target vehicle. The present disclosure can achieve a higher accuracy and a lower operational complexity in vehicle speed detection.

3 Claims, 5 Drawing Sheets

EXPRESSWAY VEHICLE SPEED MEASURING METHOD AND DEVICE BASED ON ROADSIDE MONOCULAR CAMERA CALIBRATION

TECHNICAL FIELD

The present disclosure belongs to the technical field of road traffic management, and particularly relates to an expressway vehicle speed measuring method and device based on roadside monocular camera calibration.

BACKGROUND

Speeding and slow driving of vehicles are always considered as important factors to affect traffic safety. Usually, there is a need to detect real-time speeds of moving vehicles on a road, so as to restrain the vehicles to move according to safety regulations, and provide auxiliary information for road traffic control.

The speeds of the vehicles are conventionally detected by a ground induction coil detection method, a radar detection method, a laser detection method, etc. In spite of a mature technology and a high accuracy, these methods come at a high equipment cost, does not facilitate installation and maintenance, and is seriously affected by environmental factors and almost implemented at a fixed position.

In recent years, with the advent of deep learning as well as target detection and tracking, artificial intelligence (AI) speed measurement makes astounding advances, and is widely applied in the field of traffic safety for a lower operational and maintenance cost, a higher flexibility and a higher accuracy.

Conventional video-based target detection methods such as a frame difference method, an optical flow method and a background subtraction method are defective for a large calculated amount, a poor timeliness and a susceptibility to an external background, and are far from satisfactory to real-time accurate speed measurement of the road traffic. Target detection and tracking based on a convolutional neural network (CNN) can make up the above shortfalls desirably. In most cases, this method involves mutual conversion between a world coordinate system and an image coordinate system. Presently, vehicle speed detection based on a monitoring video realizes the conversion between the world coordinate system and the image coordinate system with a simple linear function and a calibration method based on internal and external parameters of a camera. The former is vulnerable to foreshortening with a low accuracy, while the latter is relatively complex and vulnerable to a scene. In response to a changed scene, the external parameter of the camera is to be recalibrated. In speed detection application of the road traffic, the road scene changes a little and the recalibration process is a waste of the cost. Therefore, it is desired to provide a camera calibration method and a reference object to reduce manual operation and improve the detection accuracy.

SUMMARY

In view of shortages of the prior art, an objective of the present disclosure provides an expressway vehicle speed measuring method and device based on roadside monocular camera calibration, to achieve a higher accuracy and a lower operational complexity in vehicle speed detection.

Specifically, the present disclosure is implemented by the following technical solutions.

According to an aspect, the present disclosure provides an expressway vehicle speed measuring method based on roadside monocular camera calibration, including:

acquiring a traffic monitoring video in a roadside monocular camera;

segmenting the traffic monitoring video into a traffic background image set in frames, and transmitting the traffic background image set to a well-trained multi-target detection algorithm for target vehicle detection, thereby obtaining a pixel position of a target vehicle, the pixel position of the target vehicle being represented by a rectangular detection box drawn through a top left pixel position and a bottom right pixel position of the target vehicle;

tracking a target vehicle detection result in each frame through a multi-target tracking algorithm to obtain a movement locus of the target vehicle; and calculating an actual moving distance of the target vehicle according to the movement locus of the target vehicle and a fitted pixel-to-world coordinate conversion curve, thereby calculating a speed of the target vehicle.

Further, a midpoint of an edge segment at a head of the target vehicle is selected as the pixel position of the target vehicle.

Further, the calculating an actual moving distance of the target vehicle according to the movement locus of the target vehicle and a fitted pixel-to-world coordinate conversion curve includes:

substituting a relative height and a relative vertical angle of the camera at a present point, a pixel length along a road traffic direction in a traffic background image obtained by the camera, and a pixel length along a radial road traffic direction in the traffic background image obtained by the camera into the fitted pixel-to-world coordinate conversion curve to obtain a pixel-to-world coordinate conversion ratio at each pixel position in the traffic background image; and summating a corresponding pixel-to-world coordinate conversion ratio at each pixel position on the movement locus of the target vehicle according to a pixel position of the target vehicle in each video frame to obtain the actual moving distance of the target vehicle.

Further, the well-trained multi-target detection algorithm is trained as follows:

acquiring a historical traffic monitoring video through the roadside monocular camera, segmenting the historical traffic monitoring video into a traffic background image set in frames, preprocessing each traffic background image to serve as a training set, labeling a coordinate of the rectangular detection box of the target vehicle in the traffic background image, and transmitting the coordinate to a multi-target detection algorithm for training, thereby obtaining the well-trained multi-target detection algorithm.

Further, the fitted pixel-to-world coordinate conversion curve is obtained as follows:

selecting a plurality of road segments from the acquired traffic monitoring video, and measuring a lane length of each of the road segments, a lane spacing along a road traffic direction, a lane width and a lane spacing along a radial road traffic direction on site;

finding the road segment in the above step in an acquired traffic monitoring video image, calculating a pixel length and a pixel position of the road segment in a pixel coordinate system, and converting the pixel length and the pixel position into a pixel-to-world coordinate conversion curve;

- fixing a horizontal angle of the camera, adjusting a height and a vertical angle of the camera and repeating the above step for k times, k being a natural number, thereby obtaining k pixel-to-world coordinate conversion curves for the road segment along the road traffic direction, and k pixel-to-world coordinate conversion curves for the road segment along the radial road traffic direction; and
- solving the k pixel-to-world coordinate conversion curves for the road segment along the road traffic direction, and the k pixel-to-world coordinate conversion curves for the road segment along the radial road traffic direction with a nonlinear function and performing fitting to obtain fitted pixel-to-world coordinate conversion curves.

Further, the nonlinear function is given by:

$$L_P\left(p_p^{i,j}, H, A\right) = \left(a_p p_p^{i,j}\wedge 2 + b_p p_p^{i,j} + c_p\right) + \left(d_p H p_p^{i,j}\wedge 3 + e_p A p_p^{i,j}\wedge 4\right) \quad \text{(Eq. 3)}$$

$$(i \in 1, 2, 3 \ldots n,\ j \in 1, 2, 3 \ldots k)$$

$$L_V\left(p_v^{i,j}, H, A\right) = \left(a_v p_v^{i,j}\wedge 2 + b_v p_v^{i,j} + c_v\right) + \left(d_v H p_v^{i,j}\wedge 3 + e_v A p_v^{i,j}\wedge 4\right) \quad \text{(Eq. 4)}$$

$$(i \in 1, 2, 3 \ldots m,\ j \in 1, 2, 3 \ldots k)$$

where in Eq. 3 and Eq. 4, H is a relative height of the camera; A is a relative vertical angle of the camera; $a_p$, $b_p$, $c_p$, $d_p$, $e_p$, $a_v$, $b_v$, $c_v$, $d_v$ and $e_v$ are parameters to be solved; $p_p^{i,j}(i\in 1,2,3 \ldots n, j\in 1,2,3 \ldots k)$ is a horizontal coordinate of an ith point on a jth pixel-to-world coordinate conversion curve for the road segment along the road traffic direction, n being a number of the road segments along the road traffic direction; and $p_v^{i,j}(i\in 1,2,3 \ldots m, j\in 1,2,3 \ldots k)$ is a horizontal coordinate of an ith point on a jth pixel-to-world coordinate conversion curve for the road segment along the radial road traffic direction, m being a number of the road segments along the radial road traffic direction.

Further, the relative angle H of the camera is an actual height of the camera, and the relative vertical angle A of the camera is an actual angle of the camera.

According to another aspect, the present disclosure further provides an expressway vehicle speed measuring device based on roadside monocular camera calibration, including a memory and a processor, where the memory stores a computer program for realizing the expressway vehicle speed measuring method based on roadside monocular camera calibration, and the processor executes the computer program.

According to still another aspect, the present disclosure provides a computer-readable storage medium, storing a computer program, where the computer program is executed by a processor to realize steps of the expressway vehicle speed measuring method based on roadside monocular camera calibration.

The expressway vehicle speed measuring method and device based on roadside monocular camera calibration provided by the present disclosure achieve the following beneficial effects:

The present disclosure fits a pixel-to-world coordinate conversion curve into a nonlinear function. This effectively solves the problem that a foreshortening imaging characteristic of the camera affects mutual conversion between a pixel coordinate system and a world coordinate system, and achieves a higher accuracy in speed detection.

By changing a height and a photographing angle of the camera, and fitting the pixel-to-world coordinate conversion curve, the present disclosure can be applied to various scenes, and omits repeated calibration of a worker compared with the existing camera calibration method.

By summating curve segments on the pixel-to-world coordinate conversion curve to obtain a displacement of the target vehicle, the expressway vehicle speed measuring method and device based on roadside monocular camera calibration provided by the present disclosure achieve a lower algorithm complexity and better performance.

DETAILED DESCRIPTION OF THE EMBODIMENTS

The present disclosure is further described in more detail below with reference to embodiments and accompanying drawings.

Embodiment 1

Figure 1:
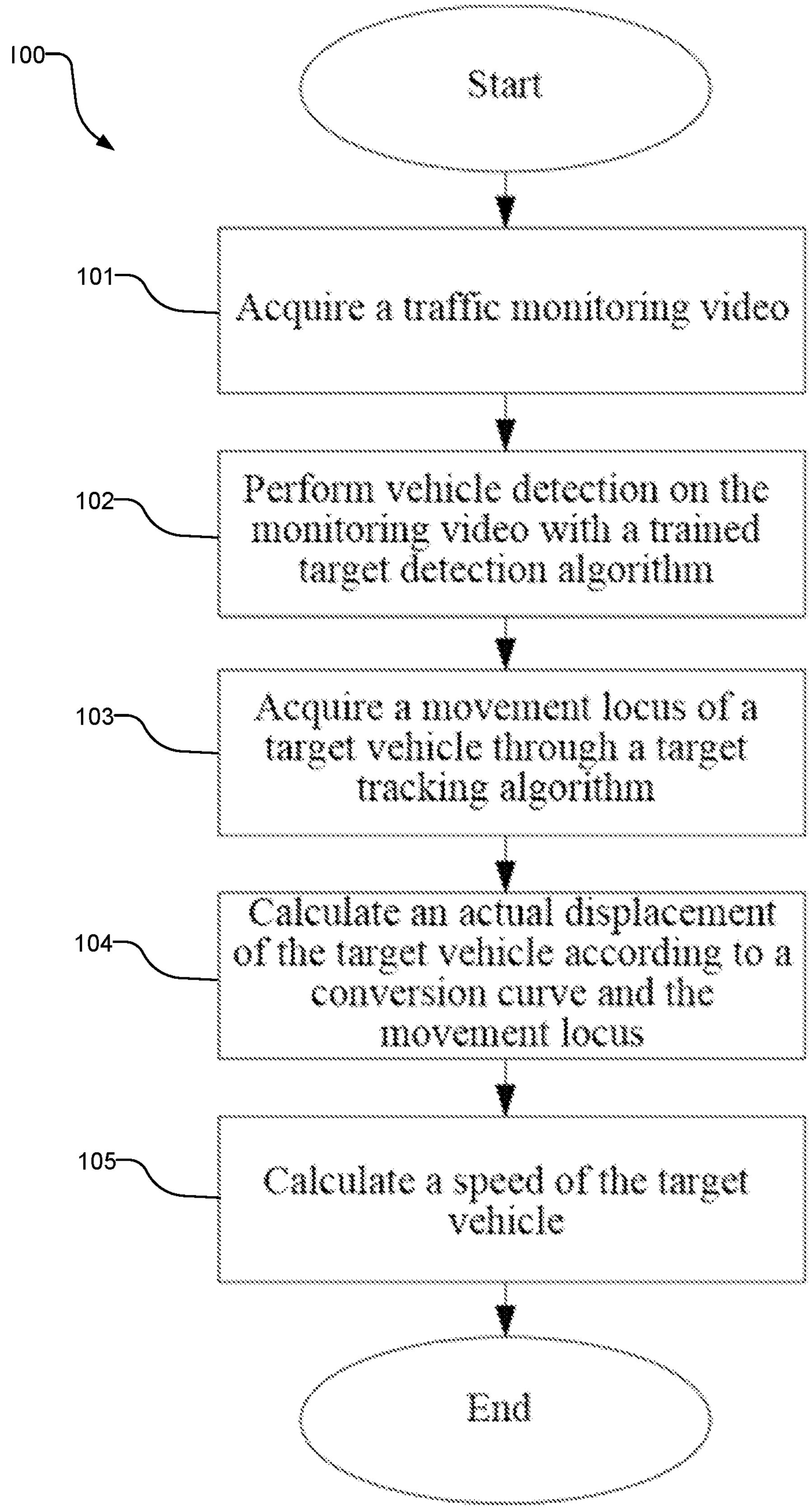
FIG. 1 illustrates a flowchart of an expressway vehicle speed measuring method based on roadside monocular camera calibration according to the present disclosure.

The embodiment of the present disclosure provides an expressway vehicle speed measuring method based on roadside monocular camera calibration. As shown in FIG. 1, the expressway vehicle speed measuring method 100 based on roadside monocular camera calibration includes the following steps.

Step 1(101): A traffic monitoring video in a roadside monocular camera is acquired.

The monocular camera at a roadside of an expressway is fixed at a specified angle and height to obtain data of the traffic monitoring video. For example, the monocular camera is deviated rightward by 10° in a horizontal angle, deviated downward by 30° in a vertical angle, and fixed at a height of 9 m. The monocular camera monitors a vehicle moving on the expressway to obtain an expressway traffic scene in the camera video.

Step 2 (102): The traffic monitoring video is segmented into a traffic background image set in frames, and the traffic background image set is transmitted to a well-trained multi-target detection algorithm for target vehicle detection, thereby obtaining a pixel position of a target vehicle, the pixel position of the target vehicle being represented by a rectangular detection box drawn through a top left pixel position and a bottom right pixel position of the target vehicle.

Since the rectangular detection box of the target vehicle is shaken easily in driving, a midpoint of an edge segment at a head of the vehicle can be selected as the pixel position of the vehicle.

The well-trained multi-target detection algorithm is trained as follows: A historical traffic monitoring video is acquired through the roadside monocular camera. The historical traffic monitoring video is segmented into an image set in frames. Each image is preprocessed to serve as a training set. A coordinate of the rectangular detection box of the target vehicle in the image is labeled, and transmitted to a multi-target detection algorithm for training, thereby obtaining the well-trained multi-target detection algorithm.

Step 3 (103): A target vehicle detection result in each frame is tracked through a multi-target tracking algorithm to obtain a movement locus of the target vehicle. Specifically:

A detection result in a present frame is predicted with a Kalman filter. A predicted result is subjected to cascade matching and intersection over union (IoU) matching with a target vehicle detection result in a next frame with a Hungary algorithm to obtain a pixel position of the target vehicle in each frame, thereby obtaining the movement locus of the target vehicle.

Step 4 (104): An actual moving distance S of the target vehicle is calculated according to the movement locus of the target vehicle and a fitted pixel-to-world coordinate conversion curve, thereby calculating a speed V of the target vehicle. Specifically:

4-1) A relative height H and a relative vertical angle A of the camera at a present point, a pixel length along a road traffic direction in a traffic background image obtained by the camera, and a pixel length along a radial road traffic direction in the traffic background image obtained by the camera are substituted into the fitted pixel-to-world coordinate conversion curve to obtain a pixel-to-world coordinate conversion ratio at each pixel position in the traffic background image.

For example, supposing that (x,y) is a point in the traffic background image obtained by the camera, a conversion ratio along the traffic direction and a conversion ratio along the radial traffic direction are respectively $L_p(y,H,A)$ and $L_v(x,H,A)$. For example, supposing that the traffic background image has a pixel length of 1000, 1000 numbers from 1 to 1000 are transmitted to $L_p$ to obtain 1000 pixel-to-world coordinate conversion ratios at different heights, and the pixel-to-world coordinate conversion ratios are stored as a pixel length-conversion ratio table.

4-2) A corresponding pixel-to-world coordinate conversion ratio at each pixel position on the movement locus of the target vehicle is summated according to a pixel position of the target vehicle in each video frame to obtain the actual moving distance S of the target vehicle, thereby calculating the speed V of the target vehicle (at 105).

Supposing that the target vehicle is located at (x1,y1) and (x2,y2) in different frames before and after movement, the actual moving distance S of the target vehicle is given by Eq. 1 and the speed V of the target vehicle is given by Eq. 2:

$$S=\sqrt{\left(\sum_{y1}^{y2} L_P(y,H,A)\right)^2+\left(\sum_{x1}^{x2} L_V(x,H,A)\right)^2} \quad \text{(Eq. 1)}$$

$$V=S\times fps \quad \text{(Eq. 2)}$$

In Eq. 1, H is the relative height of the camera, and A is the relative vertical angle of the camera. In Eq. 2, S is the actual moving distance of the target vehicle, and fps is a frame rate of the video.

Figure 2:
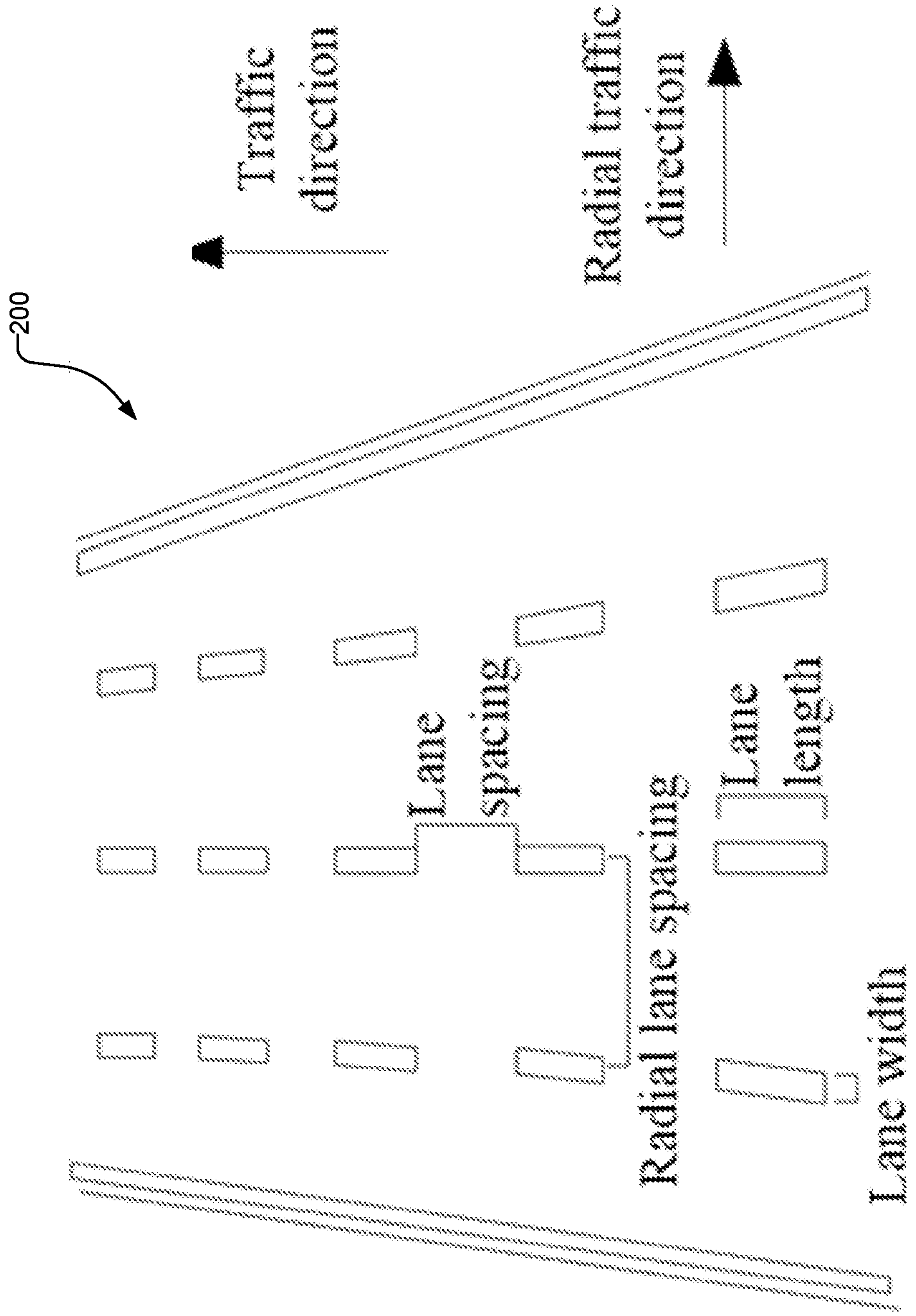
FIG. 2 schematically illustrates a simulated image of a traffic scene according to an embodiment of the present disclosure.
Figure 3:
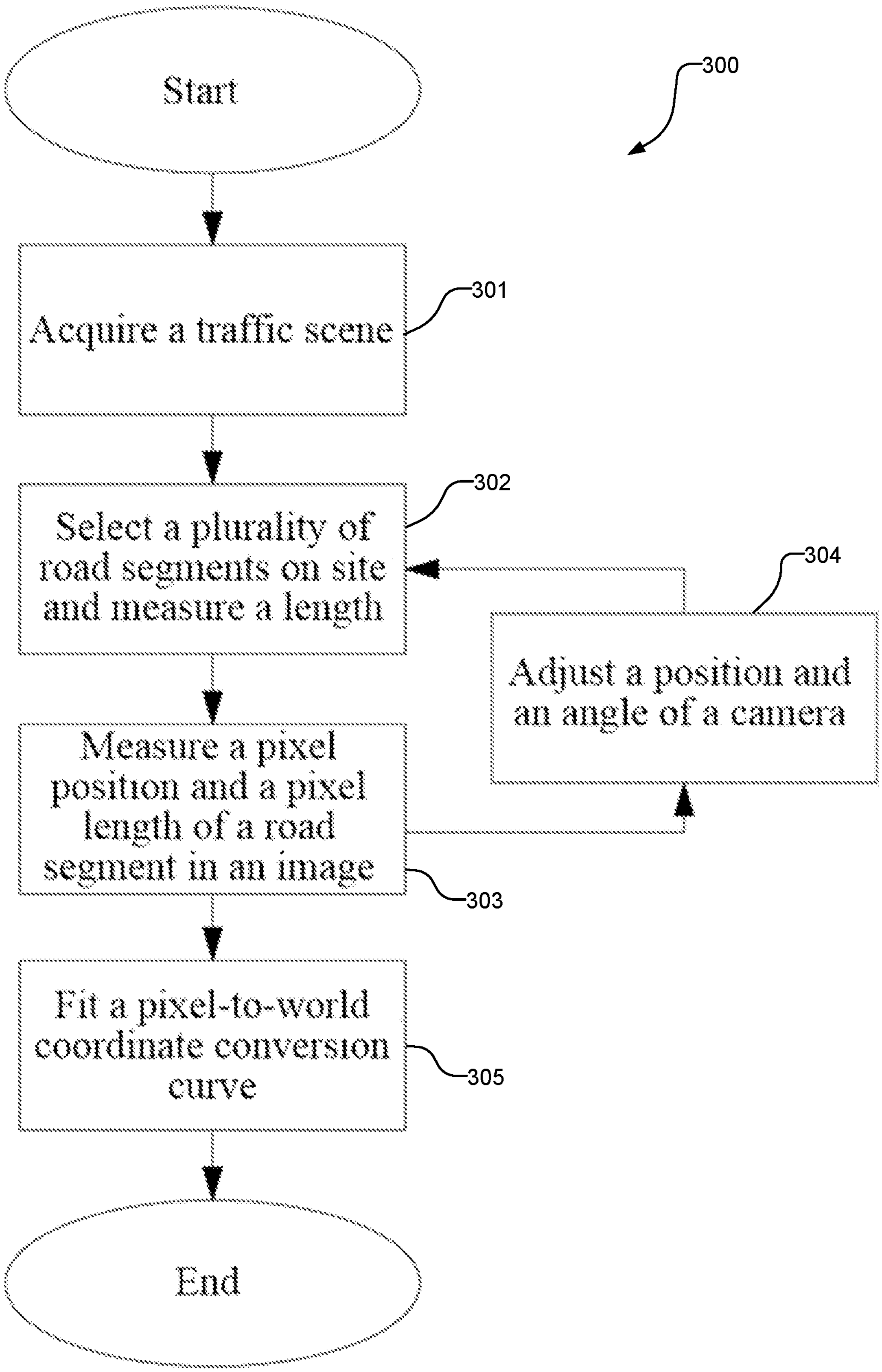
FIG. 3 illustrates a flowchart of a method for obtaining a pixel-to-world coordinate conversion curve according to the present disclosure.

The fitted pixel-to-world coordinate conversion curve is obtained as follows:

Step 1: as shown in a method 300 of FIG. 3, a traffic scene is acquired (at 301). A plurality of road segments are selected from the acquired traffic monitoring video, and a lane length of each of the road segments, a lane spacing along a road traffic direction, a lane width and a lane spacing along a radial road traffic direction are measured on site (at 302). Specifically:

As shown in FIG. 2, for a given scene 200 of the acquired traffic scene video, lengths of consecutive n road segments on the expressway, including an actual lane length and a lane spacing, are measured on site along the road traffic direction from a side close to the camera, and are respectively labeled as $l_{wp}^i(i\in 1,2,3\ldots n)$. For the acquired traffic scene video, lengths of consecutive m road segments on the expressway, including an actual lane width and a radial lane spacing, are measured on site along the radial road traffic direction from the side close to the camera, and are respectively labeled as $l_{wp}^i(i\in 1,2,3\ldots m)$.

For example, for the acquired traffic scene, lengths of 12 positions on the expressway, including the actual lane length and the lane spacing, are measured along the road traffic direction from the side close to the camera, and are respectively labeled as $l_{wp}^i(i\in 1,2,3\ldots 12)$. Lengths of 8 positions on the expressway, including the actual lane width and the radial lane spacing, are measured along the radial road traffic direction from the side close to the camera, and are respectively labeled as $l_{wp}^i(i\in 1,2,3\ldots 8)$.

Step 2: The road segment in the above step is found in an acquired traffic monitoring video image, a pixel length and a pixel position of the road segment in a pixel coordinate system are calculated, and the pixel length and the pixel position are converted into a pixel-to-world coordinate conversion curve. Specifically:

2-1) The road segment in the above step is found in the traffic scene video image acquired by the camera, and the pixel length of the road segment in the pixel coordinate system is calculated (at 303).

For example, supposing that coordinates of two ends of the road segment in the pixel coordinate system are respectively (x1,y1) and (x2,y2), the road segment has the pixel length of $((x1-x2)^2+(y1-y2)^2)^{1/2}$. The pixel length of the road segment along the road traffic direction in the pixel coordinate system is labeled as $l_{pp}^i(i\in 1,2,3\ldots n)$, and the pixel length of the road segment along the radial road traffic direction in the pixel coordinate system is labeled as $l_{pp}^i$ $(i\in 1,2,3\ldots m)$.

2-2) The road segment in the above step is found in the traffic scene video image acquired by the camera, and the pixel position of the road segment in the pixel coordinate system is calculated.

For example, supposing that coordinates of two ends of the road segment in the pixel coordinate system are respectively (x1,y1) and (x2,y2), and (x2,y2) is closer to the roadside camera, the road segment has the pixel position of (a*x1+b*x2,a*y1+b*y2), a+b=1. Due to a foreshortening imaging characteristic, a is less than b, and for example, a=0.4, b=0.6. The pixel position of the road segment along the road traffic direction in the pixel coordinate system is labeled as $p_p^i(i\in 1,2,3\ldots n)$, and the pixel position of the road segment along the radial road traffic direction in the pixel coordinate system is labeled as $p_v^i(i\in 1,2,3\ldots m)$.

2-3) A conversion ratio of an actual length to the pixel length of the road segment in each of the road traffic direction and the radial road traffic direction is calculated.

The n road segments measured along the road traffic direction at the side close to the camera have the actual length of $l_{wp}^{i}$($i \in 1,2,3 \ldots n$), and the corresponding pixel length of $l_{pp}^{i}$($i \in 1,2,3 \ldots n$) in the pixel coordinate system. The conversion ratio of the actual length to the pixel length of the road segment along the road traffic direction is $l_{wp}^{i}/l_{pp}^{i}$($i \in 1,2,3 \ldots n$). The m road segments measured along the radial road traffic direction at the side close to the camera have the actual length of $l_{wv}^{i}$($i \in 1,2,3 \ldots m$), and the corresponding pixel length of $l_{pv}^{i}$($i \in 1,2,3 \ldots m$) in the pixel coordinate system. The conversion ratio of the actual length to the pixel length of the road segment along the radial road traffic direction is $l_{wv}^{i}/l_{pv}^{i}$($i \in 1,2,3 \ldots m$).

2-4) The pixel-to-world coordinate conversion curve is drawn according to the pixel position of the road segment as well as the conversion ratio of the actual length to the pixel length.

Figure 4:
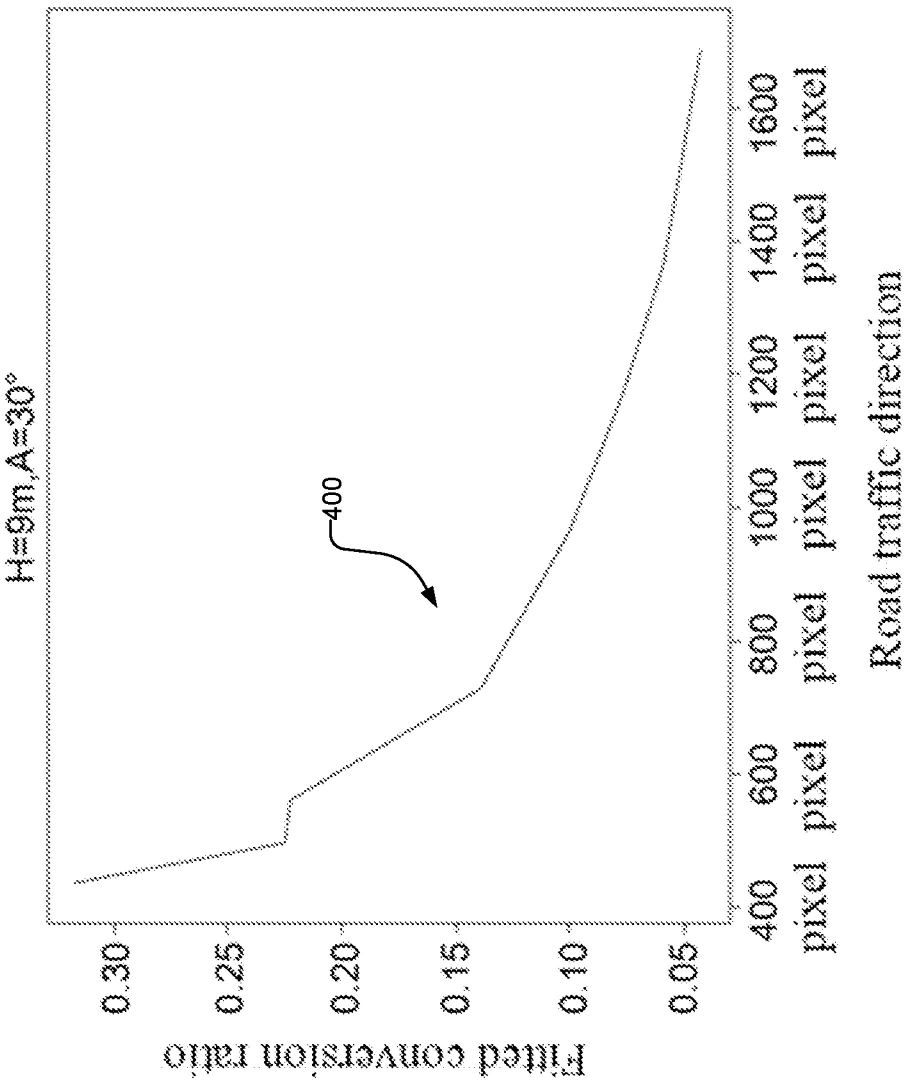
FIG. 4 illustrates a pixel-to-world coordinate conversion curve obtained from data of 20 road segments acquired by a camera according to an embodiment of the present disclosure, where the camera is deviated rightward by 10° in a horizontal angle and deviated downward by 30° in a vertical angle, and is located at a height of 9 m.

For the road segment along the road traffic direction, according to the pixel position $p_p^{i}$($i \in 1,2,3 \ldots n$) and the conversion ratio $l_{wp}^{i/l}{}_{pp}^{i}$($i \in 1,2,3 \ldots n$) of the actual length to the pixel length, the pixel-to-world coordinate conversion curve of the road segment along the road traffic direction is drawn as ($p_p^{i}$,$l_{wp}^{i}/l_{pp}^{i}$)($i \in 1,2,3 \ldots n$), as shown at 400 in FIG. 4. For the road segment along the radial road traffic direction, according to the pixel position $p_v^{i}$($i \in 1,2,3 \ldots m$) and the conversion ratio $l_{wv}^{i}/l_{pv}^{i}$($i \in 1,2,3 \ldots m$) of the actual length to the pixel length, the pixel-to-world coordinate conversion curve of the road segment along the radial road traffic direction is drawn as ($p_v^{i}$,$l_{wv}^{i}/l_{pv}^{i}$)($i \in 1,2,3 \ldots m$).

Step 3: A horizontal angle of the camera is fixed, a height and a vertical angle of the camera are adjusted (at 304) and the above step is repeated for k times, k being a natural number, thereby obtaining k pixel-to-world coordinate conversion curves for the road segment along the road traffic direction, and k pixel-to-world coordinate conversion curves for the road segment along the radial road traffic direction.

Because of a photographing direction directly facing the road, the roadside camera has a relatively fixed horizontal rotating angle and is less affected by foreshortening. In the present disclosure, a horizontal angle of the camera is fixed, a height and a vertical angle of the camera are adjusted, and the above step is repeated for k time, thereby obtaining k pixel-to-world coordinate conversion curves ($p_p^{i,j}$, $l_{wp}^{i,j}/l_{pp}^{i,j}$)($i \in 1,2,3 \ldots n, j \in 1,2,3 \ldots k$) for the road segment along the road traffic direction at different heights and angles, labeled as $L_p'$, and k pixel-to-world coordinate conversion curves ($p_v^{i,j}$,$l_{wv}^{i,j}/l_{pv}^{i,j}$)($i \in 1,2,3 \ldots m, j \in 1,2,3 \ldots k$) for the road segment along the radial road traffic direction, labeled as $L_p'$.

For example, the horizontal angle of the camera is deviated toward the road by $10^0$, only the height and the angle of the camera are adjusted, 20 road segments are selected repeatedly, and the pixel position and the pixel length of each of the road segments are measured. The camera is located at a height of 6 m, 9 m and 12 m, with a vertical angle being horizontally downward 15°, 30° and 45°. There are nine groups of heights and vertical angles in total, and Step 3 is repeated, thereby obtaining nine pixel-to-world coordinate conversion curves ($p_p^{i,j}$,$l_{wp}^{i,j}/l_{pp}^{i,j}$)($i \in 1,2,3 \ldots 12, j \in 1,2,3 \ldots 9$), for the road segment along the road traffic direction, labeled as $L_p'$, i being different road segments, and j being different heights and angles of the camera, and nine pixel-to-world coordinate conversion curves ($p_v^{i,j}$,$l_{wv}^{i,j}/l_{pv}^{i,j}$)($i \in 1,2,3 \ldots 8, j \in 1,2,3 \ldots 9$) for the road segment along the radial road traffic direction, labeled as $L_v'$, i being different road segments, and j being the different heights and angles of the camera.

Step 4: The k pixel-to-world coordinate conversion curves $L_p'$ for the road segment along the road traffic direction, and the k pixel-to-world coordinate conversion curves $L_v'$ for the road segment along the radial road traffic direction are solved with a nonlinear function and fitting is performed (at 305) to obtain fitted pixel-to-world coordinate conversion curves $L_p$ and $L_v$. Specifically:

Known camera parameters, values on the k pixel-to-world coordinate conversion curves $L_p'$ for the road segment along the road traffic direction, and values on the k pixel-to-world coordinate conversion curves $L_v'$ for the road segment along the radial road traffic direction are respectively substituted into nonlinear functions shown in Eq. 3 and Eq. 4, the nonlinear functions are solved, and the fitted pixel-to-world coordinate conversion curve for the road segment along the road traffic direction and the fitted pixel-to-world coordinate conversion curve for the road segment along the radial road traffic direction are drawn.

$$L_P(p_p^{i,j}, H, A) = (a_p p_p^{i,j} \wedge 2 + b_p p_p^{i,j} + c_p) + (d_p H p_p^{i,j} \wedge 3 + e_p A p_p^{i,j} \wedge 4) \quad \text{(Eq. 3)}$$

$$(i \in 1, 2, 3 \ldots n, j \in 1, 2, 3 \ldots k)$$

$$L_V(p_v^{i,j}, H, A) = (a_v p_v^{i,j} \wedge 2 + b_v p_v^{i,j} + c_v) + (d_v H p_v^{i,j} \wedge 3 + e_v A p_v^{i,j} \wedge 4) \quad \text{(Eq. 4)}$$

$$(i \in 1, 2, 3 \ldots m, j \in 1, 2, 3 \ldots k)$$

In Eq. 3 and Eq. 4, H and A are the known camera parameters; H is the relative height of the camera, such as 10 m; A is the relative vertical angle of the camera, such as 60°; and H may be an actual height of the camera, and A may be an actual angle of the camera, so as to prevent instable function fitting due to a big difference between H and A; $a_p$, $b_p$, $c_p$, $d_p$, $e_p$, $a_v$, $b_v$, $c_v$, $d_v$ and $e_v$ are parameters to be solved; $p_p^{i,j}$($i \in 1,2,3 \ldots n, j \in 1,2,3 \ldots k$) is a horizontal coordinate of an ith point on a jth pixel-to-world coordinate conversion curve for the road segment along the road traffic direction, n being a number of the road segments along the road traffic direction; and $p_v^{i,j}$($i \in 1,2,3 \ldots m, j \in 1,2,3 \ldots k$) is a horizontal coordinate of an ith point on a jth pixel-to-world coordinate conversion curve for the road segment along the radial road traffic direction, m being a number of the road segments along the radial road traffic direction.

Figure 5:
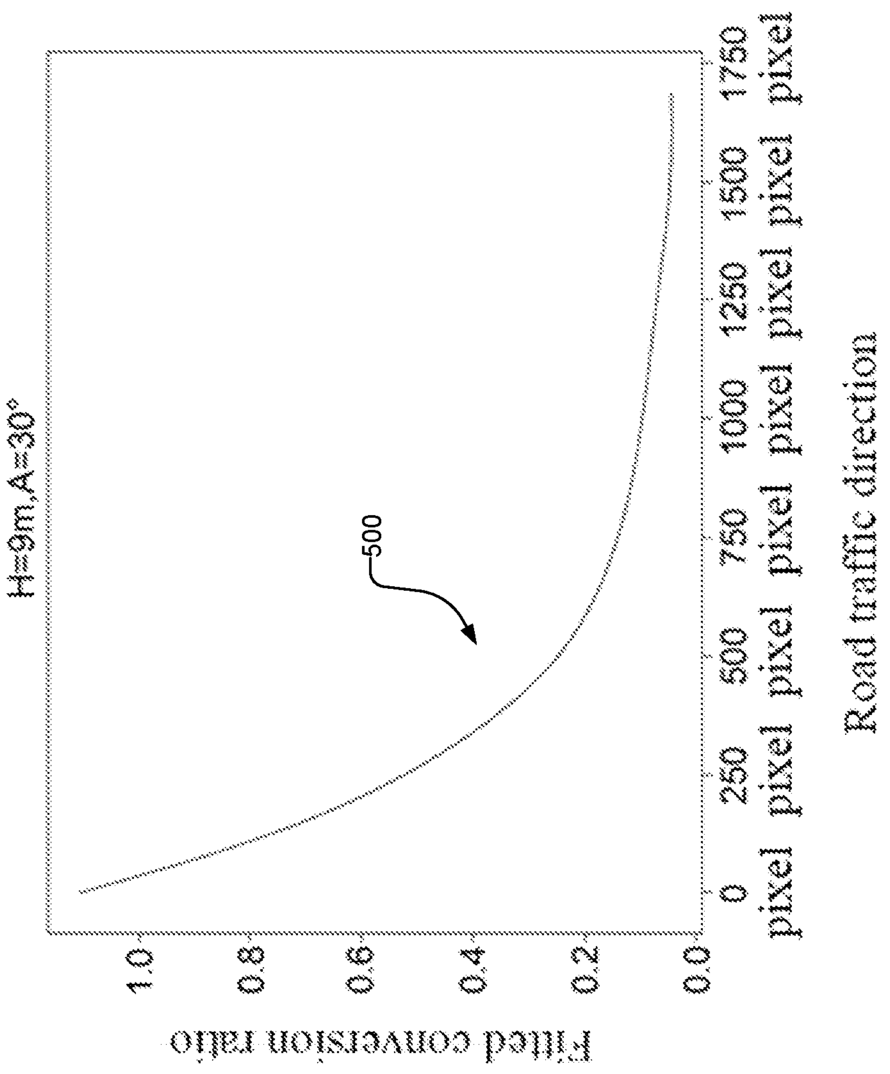
FIG. 5 illustrates a fitted pixel-to-world coordinate conversion curve according to the present disclosure.

For example, each group of H and A, and ($p_p^{i,j}$,$l_{wp}^{i,j}/l_{pp}^{i,j}$)($i \in 1,2,3 \ldots n, j \in 1,2,3 \ldots k$) are substituted into Eq. 3, Eq. 5 is solved through a least square method to obtain $a_p$, $b_p$, $c_p$, $d_p$ and $e_p$, and the fitted pixel-to-world coordinate conversion curve for the road segment along the road traffic direction under the group of H and A is drawn, as shown at 500 in FIG. 5. Each group of H and A, and ($p_v^{i,j}$,$l_{wv}^{i,j}/l_{pv}^{i,j}$)($i \in 1,2,3 \ldots m, j \in 1,2,3 \ldots k$) are substituted into Eq. 4, Eq. 6 is solved through a least square method to obtain $a_v$, $b_v$, $c_v$, $d_v$ and $e_v$, and the fitted pixel-to-world coordinate conversion curve for the road segment along the radial road traffic direction under the group of H and A is drawn.

$$\min \sum_{i=1}^{n} \sum_{j=1}^{k} \left(l_{wp}^{i,j} / l_{pp}^{i,j} - L_P\right)^2 \quad \text{(Eq. 5)}$$

$$\min \sum_{i=1}^{m} \sum_{j=1}^{k} \left(l_{wv}^{i,j} / l_{pv}^{i,j} - L_V\right)^2 \quad \text{(Eq. 6)}$$

In Eq. 5 and Eq. 6, $l_{wp}^{i,j}/l_{pp}^{i,j}(i\in 1,2,3 \ldots n, j\in 1,2,3 \ldots k)$ is a longitudinal coordinate of the ith point on the jth pixel-to-world coordinate conversion curve for the road segment along the road traffic direction, n being a number of the road segments along the road traffic direction; and $l_{wv}^{i,j}/l_{pv}^{i,j}(i\in 1,2,3 \ldots m, j\in 1,2,3 \ldots k)$ is a longitudinal coordinate of the ith point on the jth pixel-to-world coordinate conversion curve for the road segment along the radial road traffic direction, m being a number of the road segments along the radial road traffic direction.

The present disclosure uses the nonlinear function for the fitting, thereby achieving a higher detection accuracy. With the height and the angle of the camera, the present disclosure can be applied to various scenes, and reduces a recalibration cost.

The present disclosure fits a pixel-to-world coordinate conversion curve into a nonlinear function. This effectively solves the problem that a foreshortening imaging characteristic of the camera affects mutual conversion between a pixel coordinate system and a world coordinate system, and achieves a higher accuracy in speed detection.

By changing a height and a photographing angle of the camera, and fitting the pixel-to-world coordinate conversion curve, the present disclosure can be applied to various scenes, and omits repeated calibration of a worker compared with the existing camera calibration method.

By summating curve segments on the pixel-to-world coordinate conversion curve to obtain a displacement of the target vehicle, the expressway vehicle speed measuring method and device based on roadside monocular camera calibration provided by the present disclosure achieve a lower algorithm complexity and better performance.

In some embodiments, some aspects of the technique described above may be implemented by one or more processors of a processing system executing software. The software includes stores or tangibly implements in other ways one or more executable instruction sets on a non-transient computer readable storage medium. The software may include instructions and some data which, when executed by one or more processors, manipulate the one or more processors to perform one or more aspects of the technique described above. The non-transient computer readable storage medium may include, for example, a magnetic or optical disk storage device, such as solid-state storage devices like a flash memory, a cache, a random access memory (RAM), etc. or other nonvolatile memory devices. Executable instructions stored on the non-transient computer readable storage medium may be source codes, assembly language codes, target codes, or in other instruction formations explained or executed in other ways by one or more processors.

The computer readable storage medium may include any storage medium accessible by a computer system to provided instructions and/or data to the computer systems during use or a combination of storage mediums. Such a storage medium may include but be not limited to an optical medium (e.g., a compact disc (CD), a digital versatile disc (DVD) or a blue-ray disc), a magnetic medium (e.g., a floppy disc, a magnetic tape or a magnetic hard drive), a volatile memory (e.g., a random access memory (RAM) or a cache), a nonvolatile memory (e.g., a read-only memory (ROM) or a flash memory) or a storage medium based on a micro electro mechanical system (MEMS). The computer readable storage medium may be embedded in a computing system (e.g., a system RAM or ROM), fixedly attached to a computing system (e.g., a magnetic hard drive), removably attached to a computing system (e.g., a CD or a flash memory based on a universal serial bus (USB)), or coupled to a computer system via a wired or wireless network (e.g., network accessible storage (NAS)).

It needs to be noted that not all acts or elements in the above general description are essential and a part of a specific act or device may be not essential. Moreover, one or more further acts or included elements may be performed in addition to those described. Still further, the sequence of acts listed is not necessarily the sequence of performing them. Moreover, these concepts have been described with reference to specific embodiments. However, it will be recognized by those of ordinary skill in the art that various alternations and changes may be made without departing from the scope of the present disclosure set forth in the appended claims. Therefore, the description and the accompanying drawings are considered to be illustrative rather than limiting, and all such alternations are included within the scope of the present disclosure.

Benefits, other advantages and solutions to problems have been described above with respect to specific embodiments. However, benefits, advantages and solutions to problems that may cause any benefit, advantage or solution to occur or become more apparent and any feature should not be construed as critical or necessary features for any or other aspects or essential features for any or all claims. Moreover, the specific embodiments described above are merely illustrative because the disclosed subject matter may be modified and implemented in such a manner that is apparently different but equivalent for those skilled in the art who benefit from the teaching herein. In addition to those described in the claims, it is not intended to limit configurations shown herein or designed details. Therefore, it is obvious that the specific embodiments disclosed above may be changed or alternated and all such changes are considered to be within the scope of the disclosed subject matter.

What is claimed is:

1. An expressway vehicle speed measuring device based on roadside monocular camera calibration, comprising a memory and a processor, wherein the memory stores a computer program for realizing an expressway vehicle speed measuring method based on roadside monocular camera calibration, and the processor executes the computer program; and the expressway vehicle speed measuring method comprises:

acquiring a traffic monitoring video in a roadside monocular camera;

segmenting the traffic monitoring video into a traffic background image set in frames, and transmitting the traffic background image set to a well-trained multi-target detection algorithm for target vehicle detection, thereby obtaining a pixel position of a target vehicle, the pixel position of the target vehicle being represented by a rectangular detection box drawn through a top left pixel position and a bottom right pixel position of the target vehicle;

tracking a target vehicle detection result in each frame through a multi-target tracking algorithm to obtain a movement locus of the target vehicle; and calculating an actual moving distance of the target vehicle according to the movement locus of the target vehicle and a fitted pixel-to-world coordinate conversion curve, thereby calculating a speed of the target vehicle, and wherein a midpoint of an edge segment at a head of the target vehicle is selected as the pixel position of the target vehicle.

2. An expressway vehicle speed measuring device based on roadside monocular camera calibration, comprising a memory and a processor, wherein the memory stores a computer program for realizing an expressway vehicle speed measuring method based on roadside monocular camera calibration, and the processor executes the computer program; and the expressway vehicle speed measuring method comprises:

acquiring a traffic monitoring video in a roadside monocular camera;

segmenting the traffic monitoring video into a traffic background image set in frames, and transmitting the traffic background image set to a well-trained multi-target detection algorithm for target vehicle detection, thereby obtaining a pixel position of a target vehicle, the pixel position of the target vehicle being represented by a rectangular detection box drawn through a top left pixel position and a bottom right pixel position of the target vehicle;

tracking a target vehicle detection result in each frame through a multi-target tracking algorithm to obtain a movement locus of the target vehicle; and calculating an actual moving distance of the target vehicle according to the movement locus of the target vehicle and a fitted pixel-to-world coordinate conversion curve, thereby calculating a speed of the target vehicle, and wherein the well-trained multi-target detection algorithm is trained as follows:

acquiring a historical traffic monitoring video through the roadside monocular camera, segmenting the historical traffic monitoring video into a traffic background image set in frames, preprocessing each traffic background image to serve as a training set. labeling a coordinate of the rectangular detection box of the target vehicle in the traffic background image, and transmitting the coordinate to a multi-target detection algorithm for training, thereby obtaining the well-trained multi-target detection algorithm.

3. A non-transitory computer-readable storage medium, storing a computer program, wherein the computer program is executed by a processor to realize steps of an expressway vehicle speed measuring method based on roadside monocular camera calibration; and the expressway vehicle speed measuring method comprises:

acquiring a traffic monitoring video in a roadside monocular camera;

segmenting the traffic monitoring video into a traffic background image set in frames, and transmitting the traffic background image set to a well-trained multi-target detection algorithm for target vehicle detection, thereby obtaining a pixel position of a target vehicle, the pixel position of the target vehicle being represented by a rectangular detection box drawn through a top left pixel position and a bottom right pixel position of the target vehicle;

tracking a target vehicle detection result in each frame through a multi-target tracking algorithm to obtain a movement locus of the target vehicle; and calculating an actual moving distance of the target vehicle according to the movement locus of the target vehicle and a fitted pixel-to-world coordinate conversion curve, thereby calculating a speed of the target vehicle, and wherein a midpoint of an edge segment at a head of the target vehicle is selected as the pixel position of the target vehicle.

* * * * *